United States Patent
Wang (10) Patent No.: US 7,447,008 B2
(45) Date of Patent: Nov. 4, 2008

(54) ELECTRONIC APPARATUS CAPABLE OF CONVENIENTLY ASSEMBLING AND DISASSEMBLING A KEY MODULE

(75) Inventor: Lin-Kun Wang, Tai-Chung City (TW)

(73) Assignee: Qisda Corporation, Taoyuan County (TW)

( * ) Notice: Subject to any disclaimer, the term of this patent is extended or adjusted under 35 U.S.C. 154(b) by 376 days.

(21) Appl. No.: 11/382,927

(22) Filed: May 11, 2006

(65) Prior Publication Data

US 2007/0033972 A1 Feb. 15, 2007

(30) Foreign Application Priority Data

May 12, 2005 (TW) ............... 94115415 A (51) Int. Cl.
*G06F 1/16* (2006.01)
(52) U.S. Cl. ...................... 361/683; 361/680
(58) Field of Classification Search ........... 361/680, 361/683; 235/472.01; 455/550.1, 575.1, 455/575.8
See application file for complete search history.

(56) References Cited

U.S. PATENT DOCUMENTS

| | | | | |
|---|---|---|---|---|
| 5,490,036 A * | 2/1996 | Lin et al. ............... | 361/680 |
| 5,510,953 A * | 4/1996 | Merkel ................. | 361/680 |
| 5,576,929 A * | 11/1996 | Uchiyama et al. ....... | 361/680 |
| 5,578,794 A * | 11/1996 | Lamb et al. ............ | 174/535 |
| 5,966,284 A * | 10/1999 | Youn et al. ............ | 361/680 |
| 6,115,239 A * | 9/2000 | Kim .................... | 361/683 |
| 6,480,373 B1 * | 11/2002 | Landry et al. .......... | 361/680 |
| 6,573,843 B1 * | 6/2003 | Murphy ................ | 361/681 |
| 6,628,506 B2 * | 9/2003 | Landry et al. .......... | 361/680 |
| 7,265,969 B2 * | 9/2007 | Jin .................... | 361/680 |
| 7,325,844 B2 * | 2/2008 | Salice ................. | 292/300 |
| 2002/0048155 A1 * | 4/2002 | Chiang et al. .......... | 361/747 |
| 2004/0190239 A1 * | 9/2004 | Weng et al. ............ | 361/683 |

* cited by examiner

*Primary Examiner*—Anatoly Vortman
*Assistant Examiner*—Adrian S Wilson (57) ABSTRACT

An electronic apparatus includes a housing, a key module including a first key, a first tenon having a first incline installed corresponding to the first key, a second key, and a second tenon having a second incline installed corresponding to the second key. The electronic apparatus further includes a retaining mechanism installed within the housing, an elastic structure, and a knob. The knob includes a third incline installed corresponding to the first tenon for sliding on the first incline when the first key is pressed to move the knob at a first distance in a compressed direction of the elastic structure, and a fourth incline installed corresponding to the second tenon for sliding on the second incline of the second tenon when the first key and the second key are pressed simultaneously to move the knob at a second distance in the compressed direction of the elastic structure.

10 Claims, 15 Drawing Sheets

ELECTRONIC APPARATUS CAPABLE OF CONVENIENTLY ASSEMBLING AND DISASSEMBLING A KEY MODULE

BACKGROUND OF THE INVENTION

1. Field of the Invention

The present invention relates to an electronic apparatus capable of conveniently assembling and disassembling a key module, more particularly, an electronic apparatus utilizing a two-step insertion mechanism to achieve the function of conveniently assembling and disassembling a key module.

2. Description of the Prior Art

In highly developed information communication systems in the modern information society, electronic devices are widely utilized in every area. For instance, the utilization of a convenient and lightweight mobile phone device has become a way of communication in our daily life; users can easily exchange and share information, experience, and opinion through the convenience of the mobile phone device. The mobile phone progressed tremendously in recent years and various types of mobile phones are continuously developed. The increasing utilization has created a demand in production, as the mobile phones are becoming common causing the technology of mobile phones to mature with the trend moving towards smaller multi-functional phones. The important issue now is how to design a more convenient mobile phone for the user to utilize.

Figure 1:
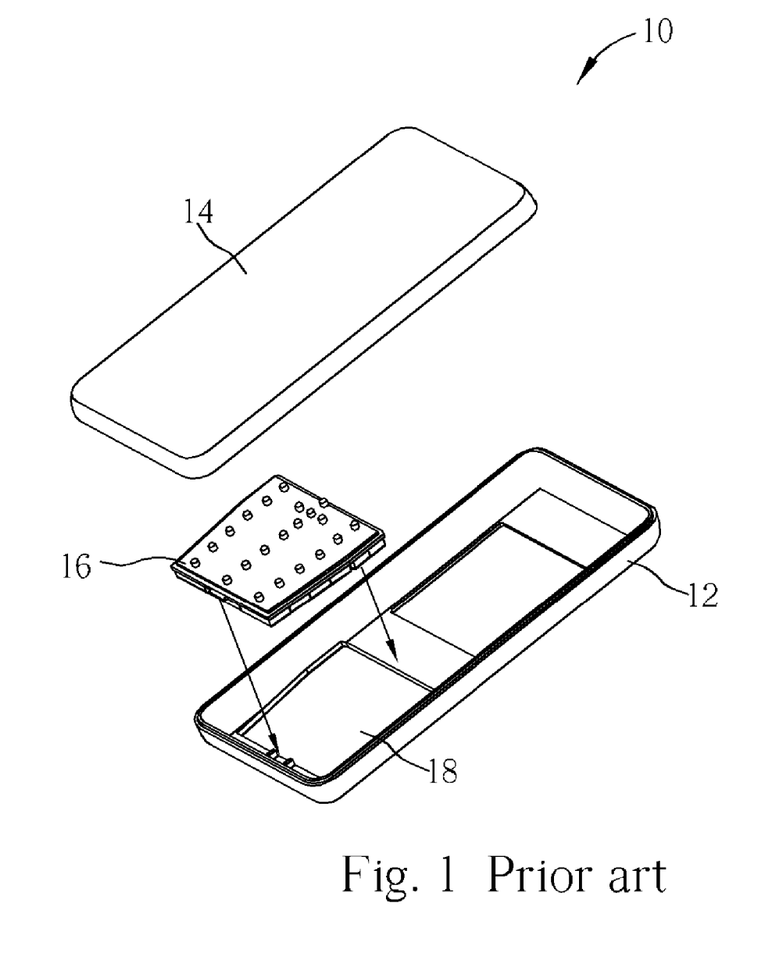
FIG. 1 illustrates a dismantle diagram of the components of a conventional portable electronic apparatus.

Please refer FIG. 1. FIG. 1 illustrates a dismantle diagram of components of a conventional portable electronic apparatus 10. The portable electronic apparatus 10 can be a mobile phone or a personal digital assistant (PDA). The components of the portable electronic apparatus 10 comprise an upper housing 12, a lower housing 14, and a key module 16. In combination of the upper housing 12 and the lower housing 14 covers the internal components of the portable electronic apparatus 10, the key module 16 can be an interface for inputting signals. Furthermore, there is a hole 18 installed on the housing 12. In general, assembling of the key module 16 is mostly intended for installing the wiring from the back of the upper housing 12, as shown by the arrow in FIG. 1. Next, the wiring is inserting into the hole 18, and then the addition of the upper housing 12 will complete the assemble of the portable electronic apparatus 10. Finally, the upper housing 12 is combined with the lower housing 14; therefore, after the upper housing 12 combines with the lower housing 14, the key module 16 cannot be disassembled or replaced externally.

However, the portable electronic apparatus nowadays emphasize on the changing appearance, as there are already electronic apparatus capable of changing outer cover or decoration board in the market, but due to the assembly problem the keypad cannot be disassembled and replaced by the user, or the disassemblying function will affect the normal function of the keypad. Therefore the important issue of designing keypad structure is how to disassemble and replace the keypad without affecting the normal appearance and function of the keypad, and without affecting the internal components when the cover is not assembled.

SUMMARY OR THE INVENTION

The claimed invention provides an electronic apparatus utilizing a two-part fastening mechanism to achieve the function conveniently of assembling and disassembling a key module to solve the above-mentioned problems.

One embodiment of the claimed invention discloses an electronic apparatus capable of conveniently assembling and disassembling a key module, the electronic apparatus comprises a housing, a key module installed on the housing, the key module comprising a first key, a first tenon comprising a first incline installed corresponding to the first key, a second key, and a second tenon, comprising a second incline installed corresponding to the second key, and the second incline is higher than the first incline. The electronic apparatus further comprises a retaining mechanism installed within the housing comprising an elastic structure and a knob connected to the elastic structure wherein a third incline is positioned corresponding to the first tenon for sliding on the first incline when the first key is pressed to move the knob at a first distance in a compressed direction of the elastic structure, and a fourth incline being higher than the third incline positioned corresponding to the second tenon for sliding on the second incline of the second tenon when the first key and the second key are pressed simultaneously to move the knob at a second distance in the compressed direction of the elastic structure.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
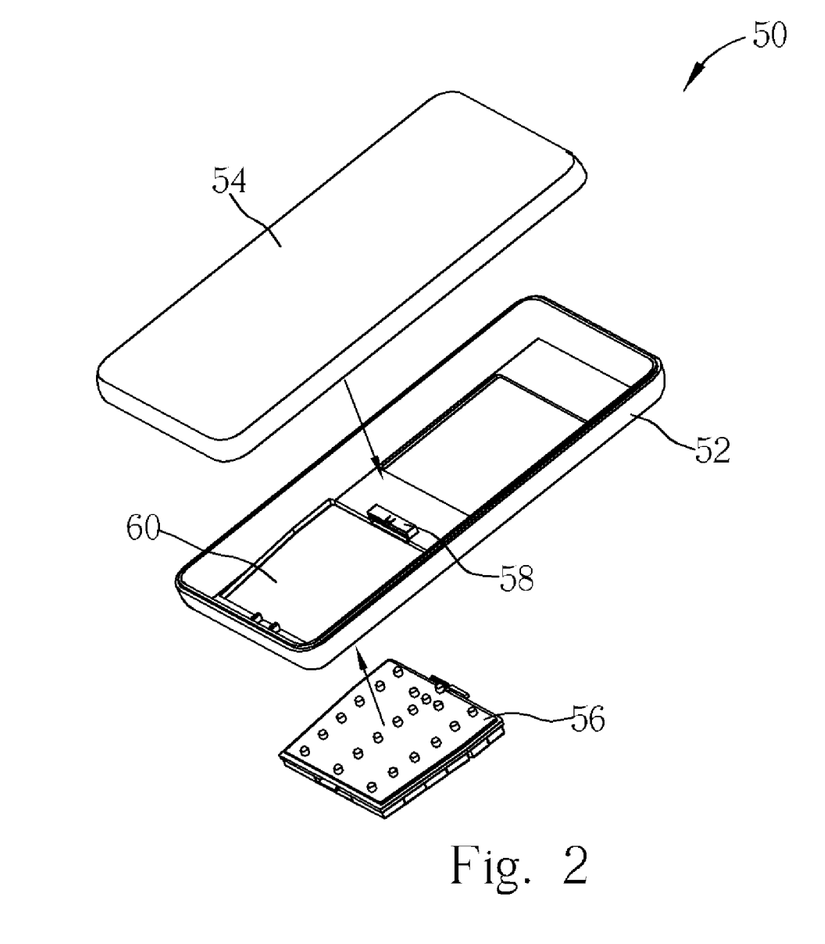
FIG. 2 illustrates a dismantle diagram of the components of a portable electronic apparatus according to the present invention.

Please refer to FIG. 2. FIG. 2 illustrates a dismantle diagram of components of a portable electronic apparatus 50 according to the present invention. The portable electronic apparatus 50 can be a mobile phone or a personal digital assistant (PDA). The portable electronic apparatus 50 comprises an upper housing 52, a lower housing 54, a key module 56, and a retaining mechanism 58. In combination the upper housing 52 and the lower housing 54 covers the internal components of the portable electronic apparatus 10, the key module 56 can be an interface for inputting signals. Furthermore, there is a hole 60 installed on the housing 52, the key module 56 can be insert into the hole 60 through side of the upper housing 52, and the retaining mechanism installed at an inner side of the upper housing for locking the key module 56.

Figure 3:
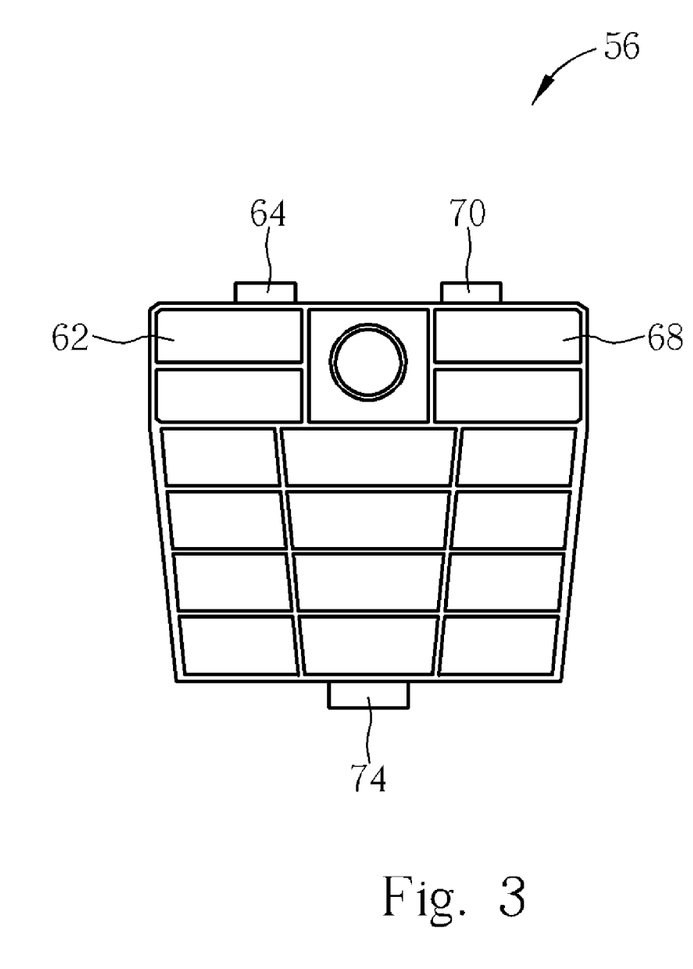
FIG. 3 illustrates an upper-view diagram of a key module according to the present invention.
Figure 4:
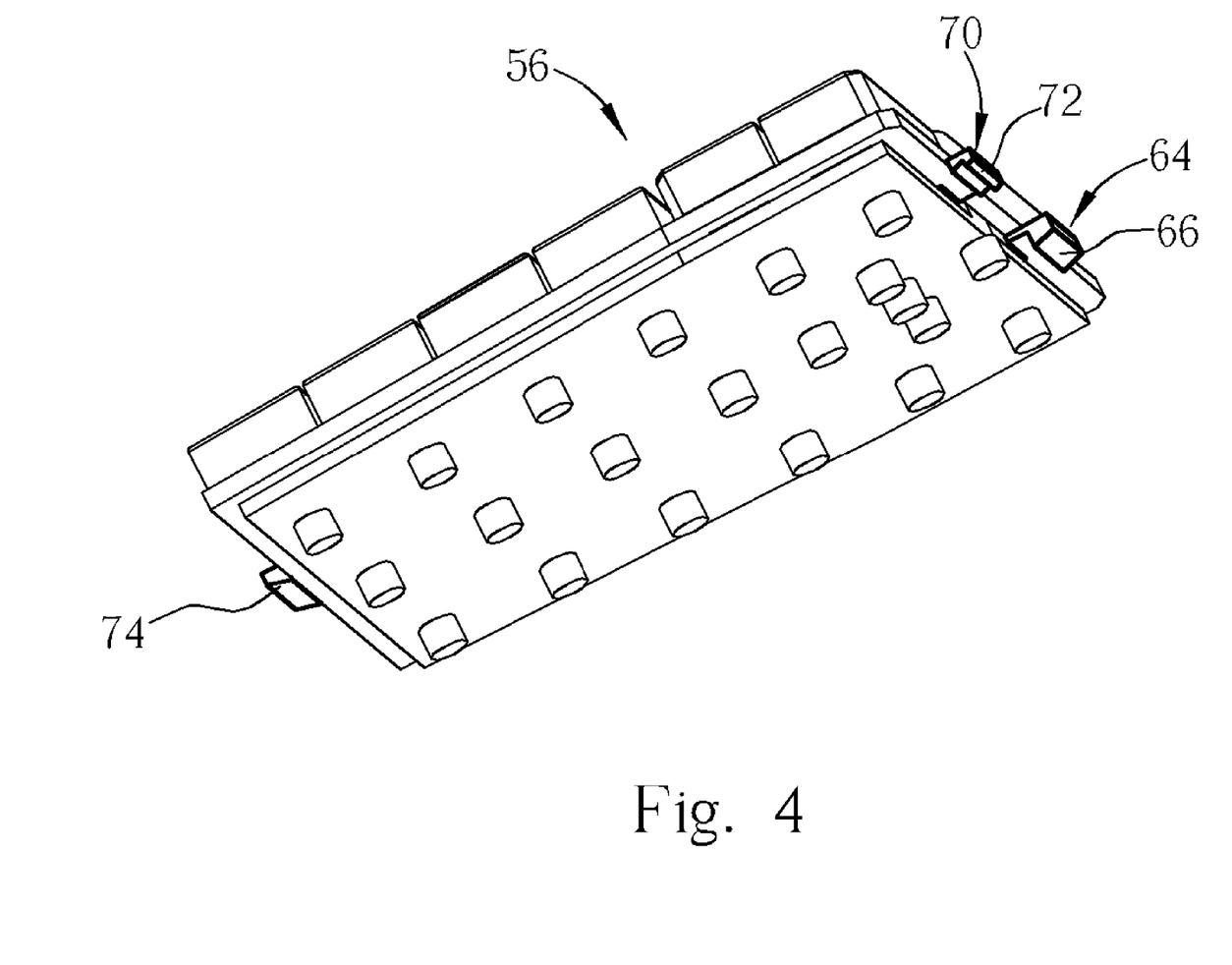
FIG. 4 illustrates a vertical view diagram of a key module according to the present invention.
Figure 5:
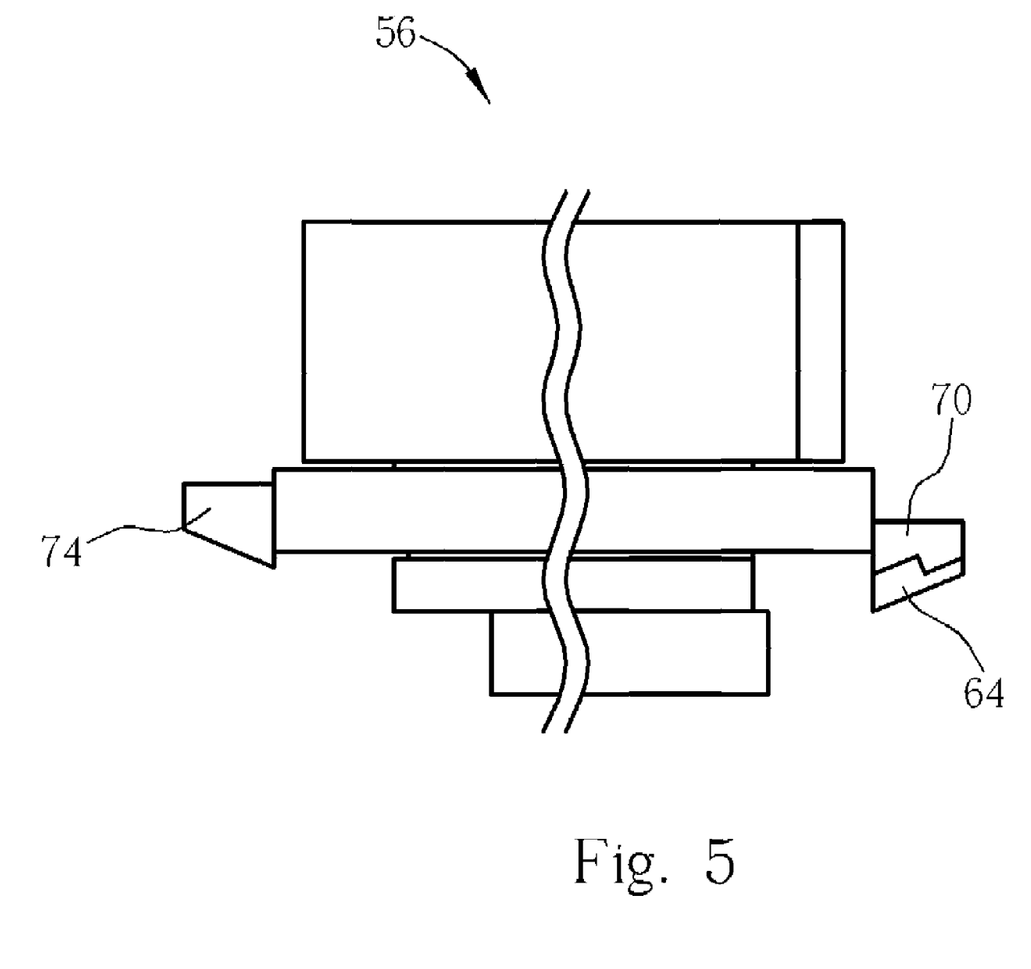
FIG. 5 illustrates a lateral view of a key module according to the present invention.

Please refer to FIG. 3, FIG. 4 and FIG. 5. FIG. 3 illustrates an upper-view diagram of a key module 56. FIG. 4 illustrates a vertical view diagram of a key module 56. FIG. 5 illustrates a lateral view of a key module 56. The key module 56 comprises a first key 62, a first tenon 64 having a first incline 66 installed corresponding to the first key 62, a second key 68, a second tenon 70 having a second incline installed corresponding the second key 68, and the second incline72 is higher than the first incline 66, and a third tenon 74 for fastening the key module 56 on the housing together with the first tenon 64 and the second tenon 70. And the first tenon 64, the second tenon 70, and the third tenon 74 are wedge-shaped structures.

Figure 6:
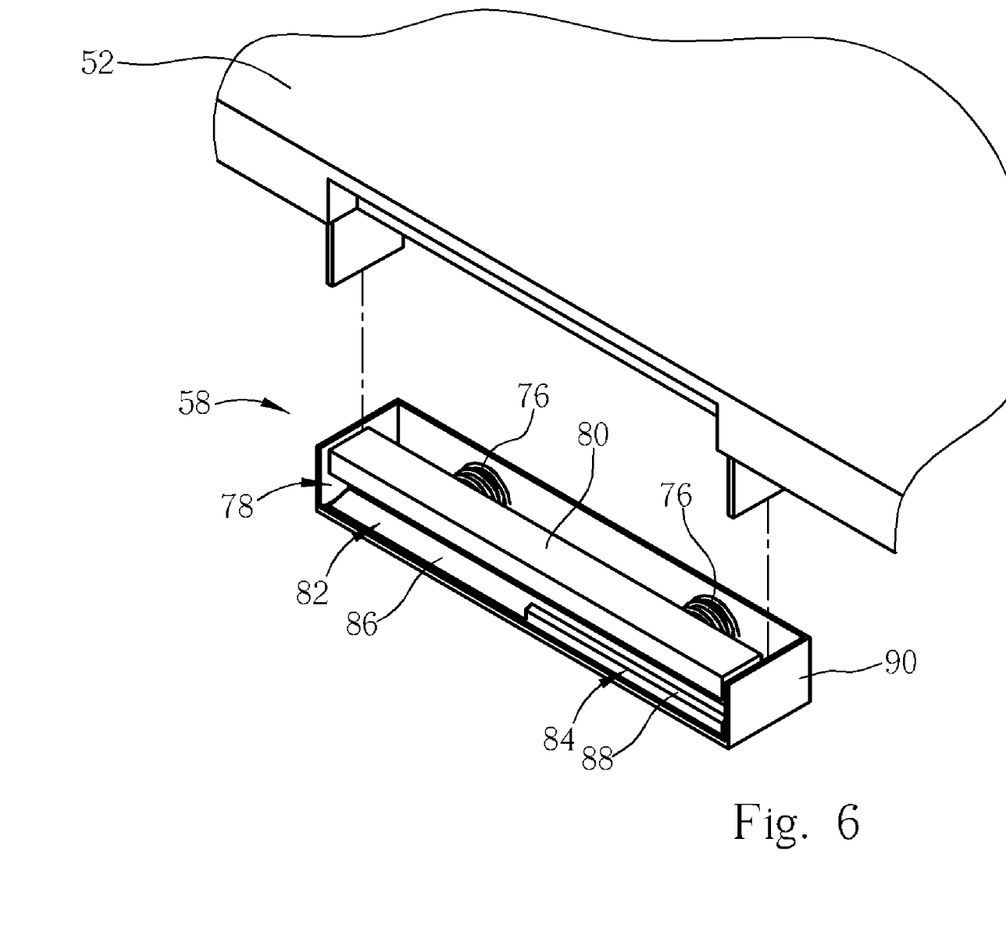
FIG. 6 illustrates a diagram of a retaining mechanism according to the present invention.

Please refer to FIG. 6. FIG. 6 illustrates a diagram of a retaining mechanism 58. The retaining mechanism 58 comprises two elastic structures 76 that can be two springs and a knob 78 connected to the elastic structure 76. The knob 78 comprises a pillar-shaped structure 80, a first wedge-shaped structure 82 installed at the bottom of the pillar structure 80, and a second wedge-shaped structure 84 installed in between the pillar-shaped structure 80 and the first wedge-shaped structure 82. A third incline 86 is formed on the first wedge-shaped structure 82, a fourth incline 88 is formed on the second wedge-shaped structure 84, where the fourth incline 88 is higher than the position of the third incline 86, also the pillar-shaped structure 80, the first wedge-shaped structure 82, and the second wedge-shaped structure 84 can interconnect in a monolithic structure. The retaining mechanism further comprises a knob base 90 for covering the elastic structure 76 and the knob 78.

Figure 7:
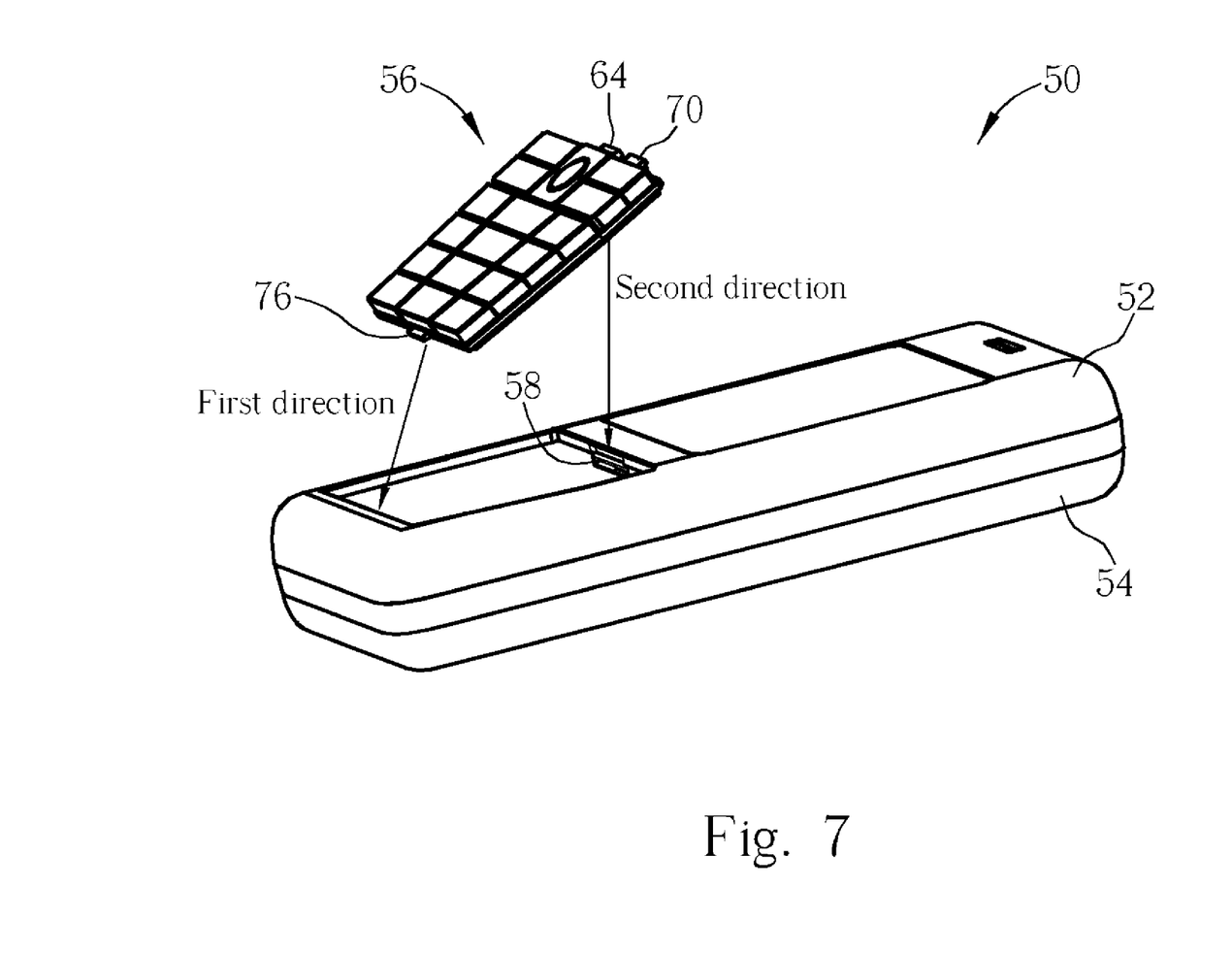
FIG. 7 illustrates a diagram of a key module assembling into a hole of an upper housing according to the present invention.
Figure 8:
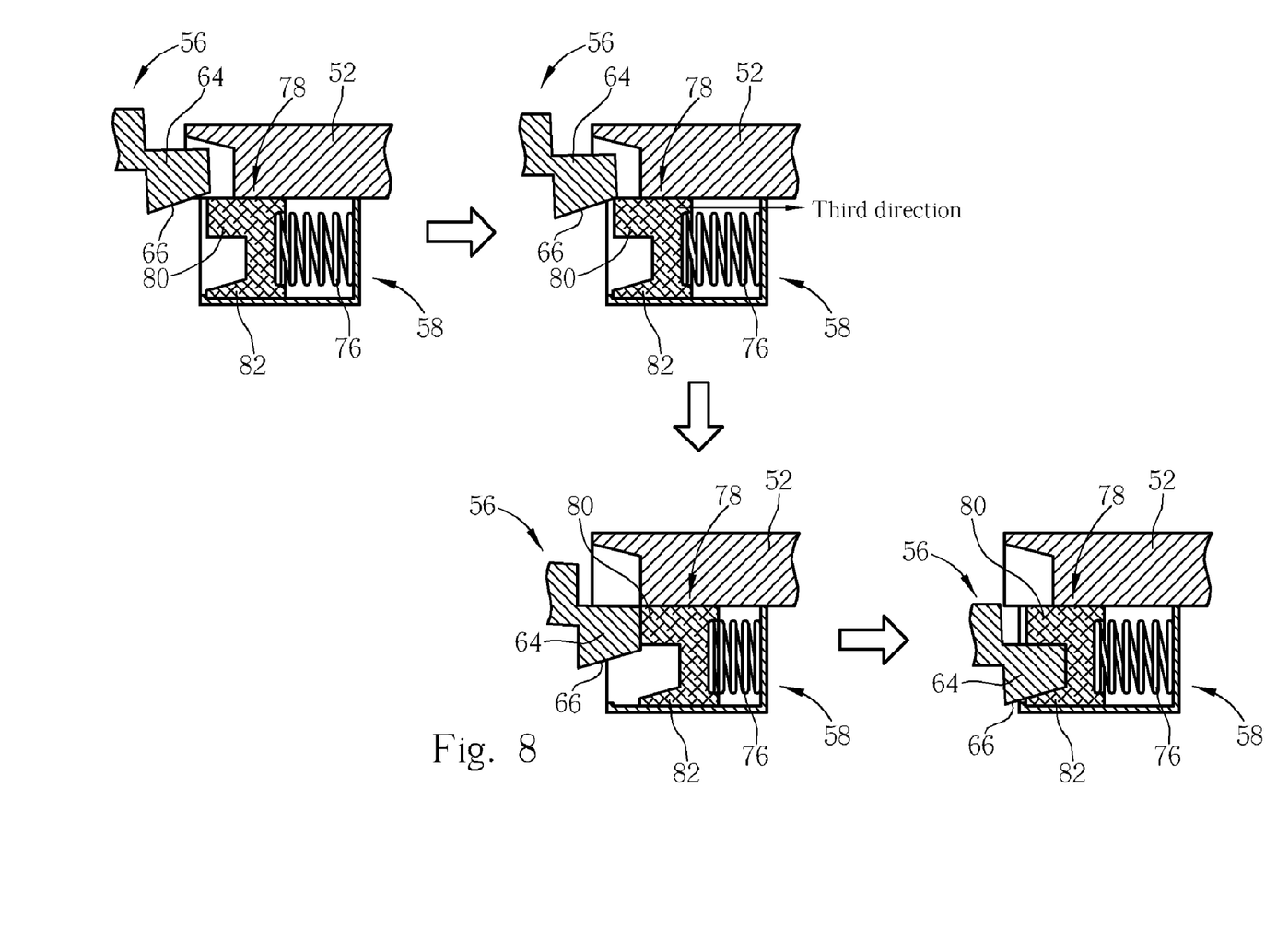
FIG. 8 illustrates a diagram of a first tenon of a key module fabricating into a retaining mechanism according to the present invention.

Please refer to FIG. 7. FIG. 7 illustrates a diagram of a key module 56 assembling into a hole 60 of an upper housing 52 according to the present invention. Assembling of the portable electronic apparatus 50 can begin after the combination of the upper housing 52 and the lower housing 54 to cover the internal components, then the key module 56 will be assembled. When assembling the key module 56, the third tenon 74 at the bottom of the key module 56 is inserted into a corresponding slot (not displayed in FIG. 7) at an angle (a first direction as shown in FIG. 7) slanting from the top of the upper housing 52, then the first tenon 64 and the second tenon 70 of the key module 56 are pressed vertically (a second direction as shown in FIG. 7) into the retaining mechanism 58. Please refer FIG. 8. FIG. 8 illustrates a diagram of a first tenon 64 of a key module 56 assembling into a retaining mechanism 58. When the first tenon 64 of the key module 56 is inserted into the retaining mechanism 58, the wedge-shaped first incline 66 of the first tenon 64 will come in contact with the pillar-shaped structure 80 of the knob 78, and a downward force pressure applied to the key module 56 will exert a horizontal force in a third direction as shown in FIG. 8 onto the pillar-shaped structure 80, and the knob 78 is pushed towards the third direction to the inner side of the retaining mechanism 58 so that the elastic structure 76 is compressed by the knob 78, and after the first tenon 64 is completely inserted in between the pillar-shaped structure 80 and the first wedge-shaped structure 82, then the horizontal force of the third direction will not be exerted. At this time, restoring force of the elastic structure 76 will drive the knob 78 back into its original position in a reversed direction of the third direction to lock the first tenon 64. As the second tenon 70 of the key module 56 has the same assembly principle as the first tenon 64, therefore it will not be further mentioned. Assembly of the key module 56 will be completed after the third tenon 74, the first tenon 64, and the second tenon 70 are locked.

Figure 9:
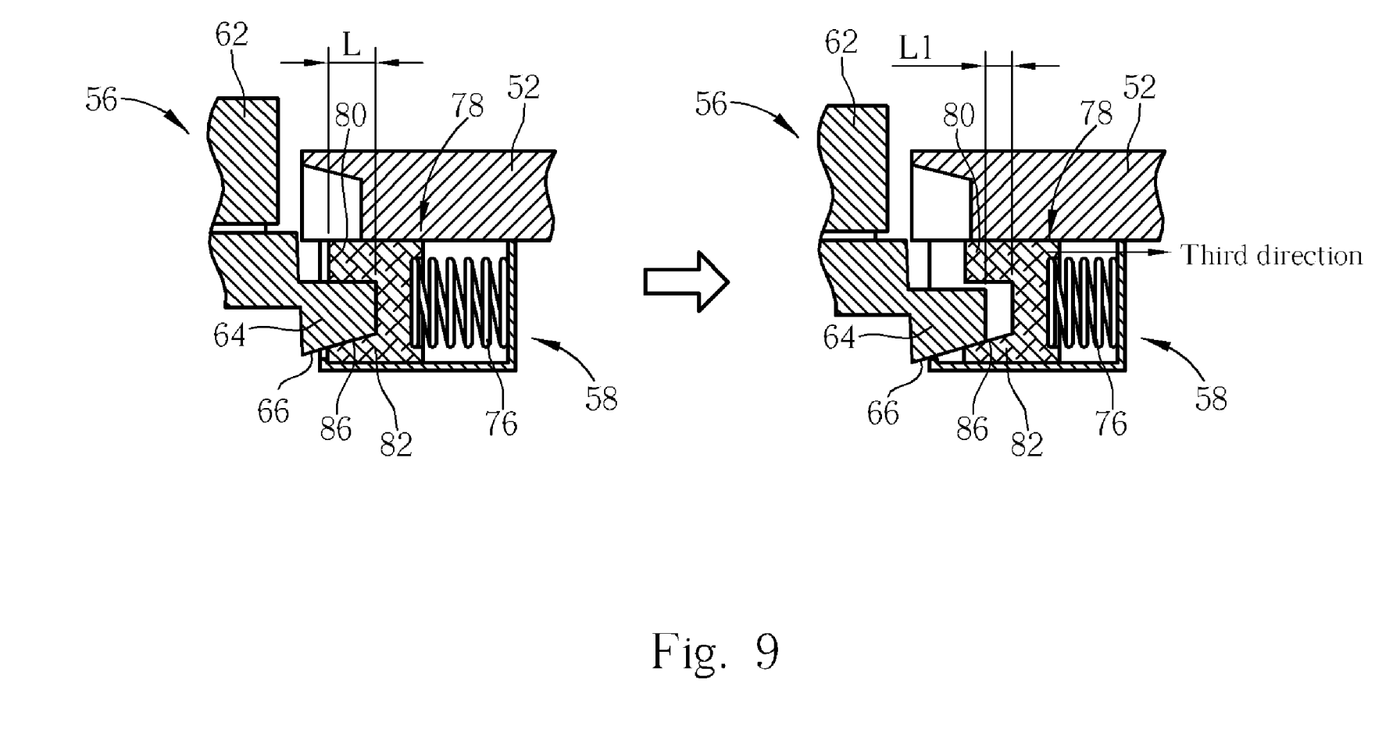
FIG. 9 illustrates a diagram of pressing a first key to active a first tenon according to the present invention.
Figure 10:
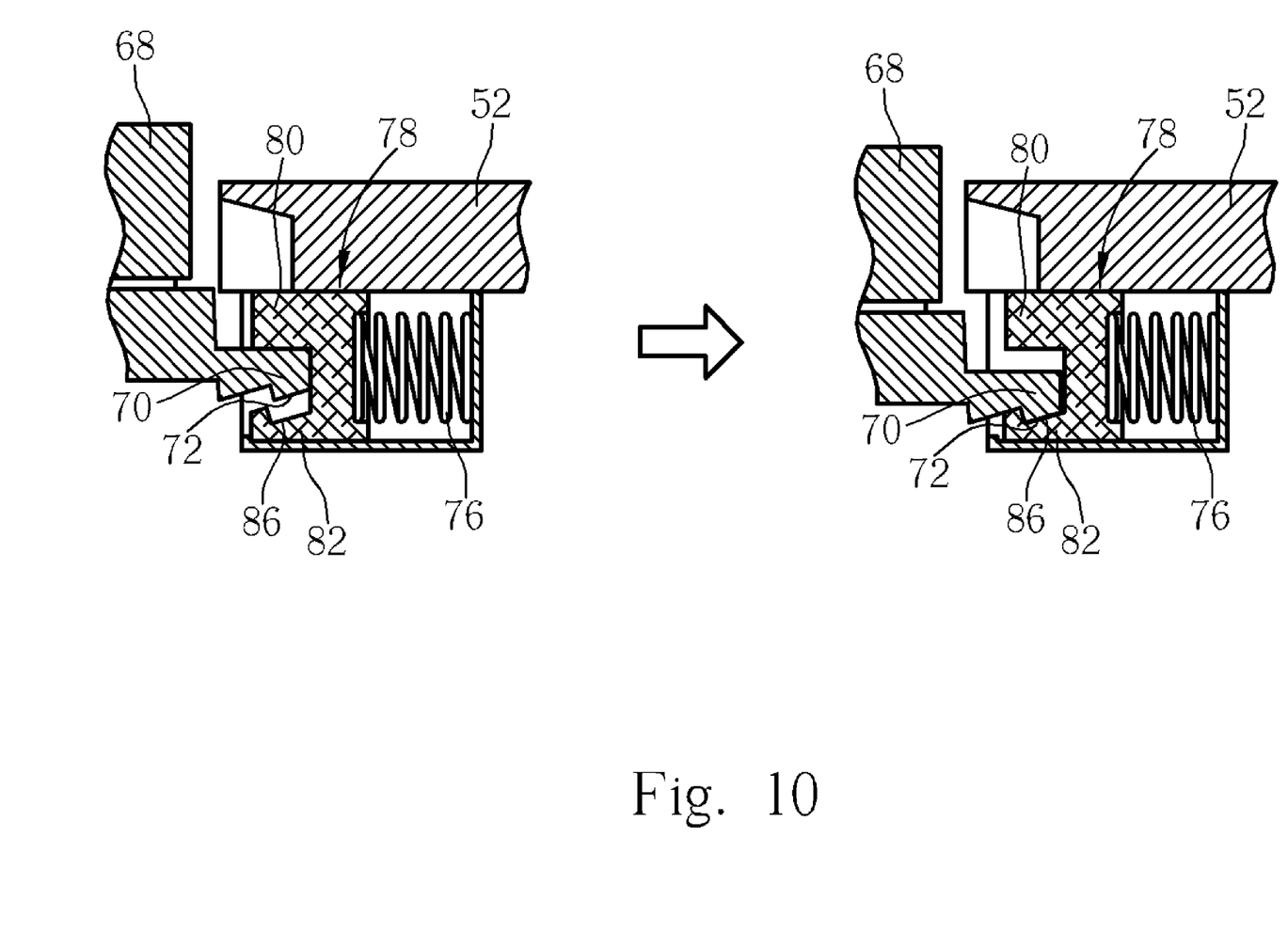
FIG. 10 illustrates a diagram of pressing a second key to activate a second tenon according to the present invention.

Please refer to FIG. 9 and FIG. 10. FIG. 9 illustrates a diagram of pressing a first key 62 to active a first tenon 64. FIG. 10 illustrates a diagram of pressing a second key 68 to activate a second tenon 70. As shown in FIG. 9, when the first key 62 of the key module 56 is pressed normally, the first key 62 pressed will correspondingly activate the first tenon 64, at this time the first incline 66 of the first tenon 64 will generate a corresponding relative slide with the third incline 86 on the first wedge-shaped structure 82 of the knob 78 so that the knob 78 moves at a first distance L1 in a direction (the third direction) towards to the compressed elastic structure 76, and when the first distance L1 is less than the first tenon 64 completely inserted into the knob 78, the top of the first tenon 64 and the pillar-shaped structure 80 will be at a contact length L of the third direction, as the first tenon 64 is still being limited in the knob 78, in other words the key module 56 cannot be separated from the upper housing 52 (not displayed in FIG. 9). Furthermore, as shown in FIG. 10, when the second key 68 of the key module 56 is pressed normally, the second key 68 pressed will correspondingly activate the second tenon 68, but as the position of the second tenon 70 is designed to be higher than the first tenon 64, when the second tenon 70 is pressed, the second incline 72 is still unable to come in contact with the third incline 86 of the first wedge-shaped structure 82, therefore it is unable to drive the knob 78, as the second tenon 70 is still being limited in the knob 78, in other words the key module 56 cannot be separated from the upper housing 52 (not displayed in FIG. 9). In conclusion to the above-mentioned, when the first key 62 or the second key 68 of the key module 56 is pressed separately, the key module 56 will not be separated from the upper housing 52, hence it will not affect the normal function of the keypad, therefore the first key 62 and the second key will not be put to waste as the first key 62 and the second key 68 can be designed to active corresponding functions respectively.

Figure 11:
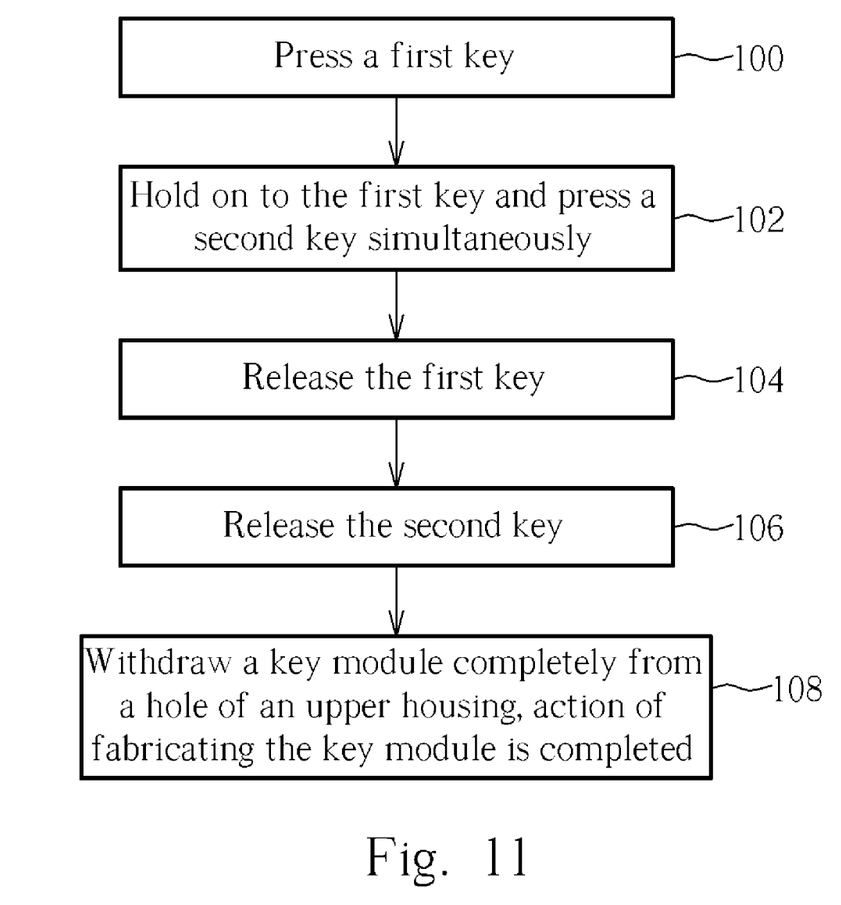
FIG. 11 illustrates a flowchart of a portable electronic apparatus fabricating a key module according to the present invention.
Figure 12:
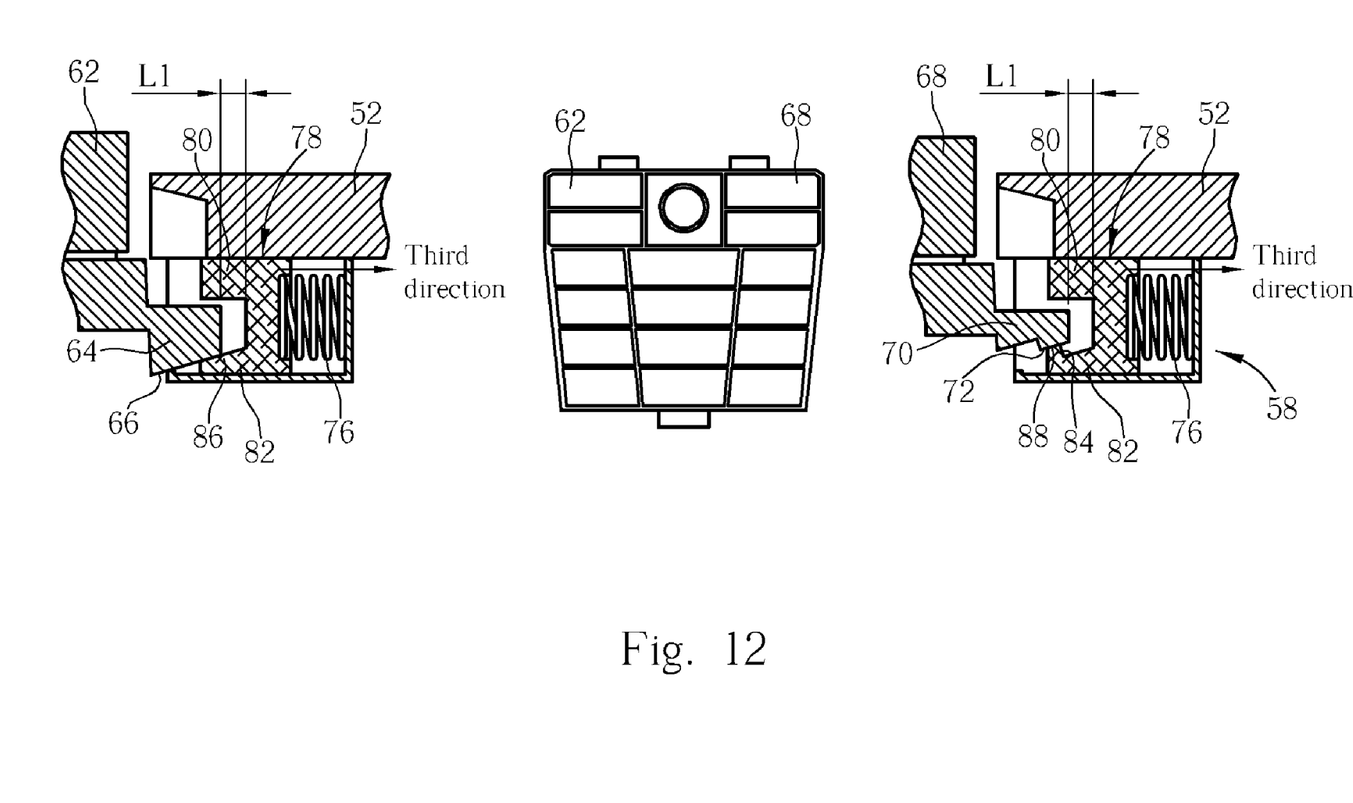
FIG. 12 illustrates a relative position diagram of a first tenon and a second tenon with a knob respectively when the first key is pressed according to the present invention.

Please refer FIG. 11. FIG. 11 illustrates a flowchart of a portable electronic apparatus 50 disassembling a key module 56. The method of disassembling the key module 56 includes the following steps:

Step 100: Please refer FIG. 9, first, press the first key 62 of the key module 56 so that the knob 78 is moved at the first distance L1 in a direction (the third direction) towards to the compressed elastic structure 76, please refer FIG. 12. FIG. 12 illustrates a relative position diagram of a first tenon 64 and a second tenon 70 with a knob 78 respectively when the first key 62 is pressed. At this time, as the knob 78 is moved towards the first distance L1 in the third direction, the fourth incline 88 of the second wedge-shaped structure 84 of the knob 78 will come in contact with the second incline 72 of the second tenon 70.

Figure 13:
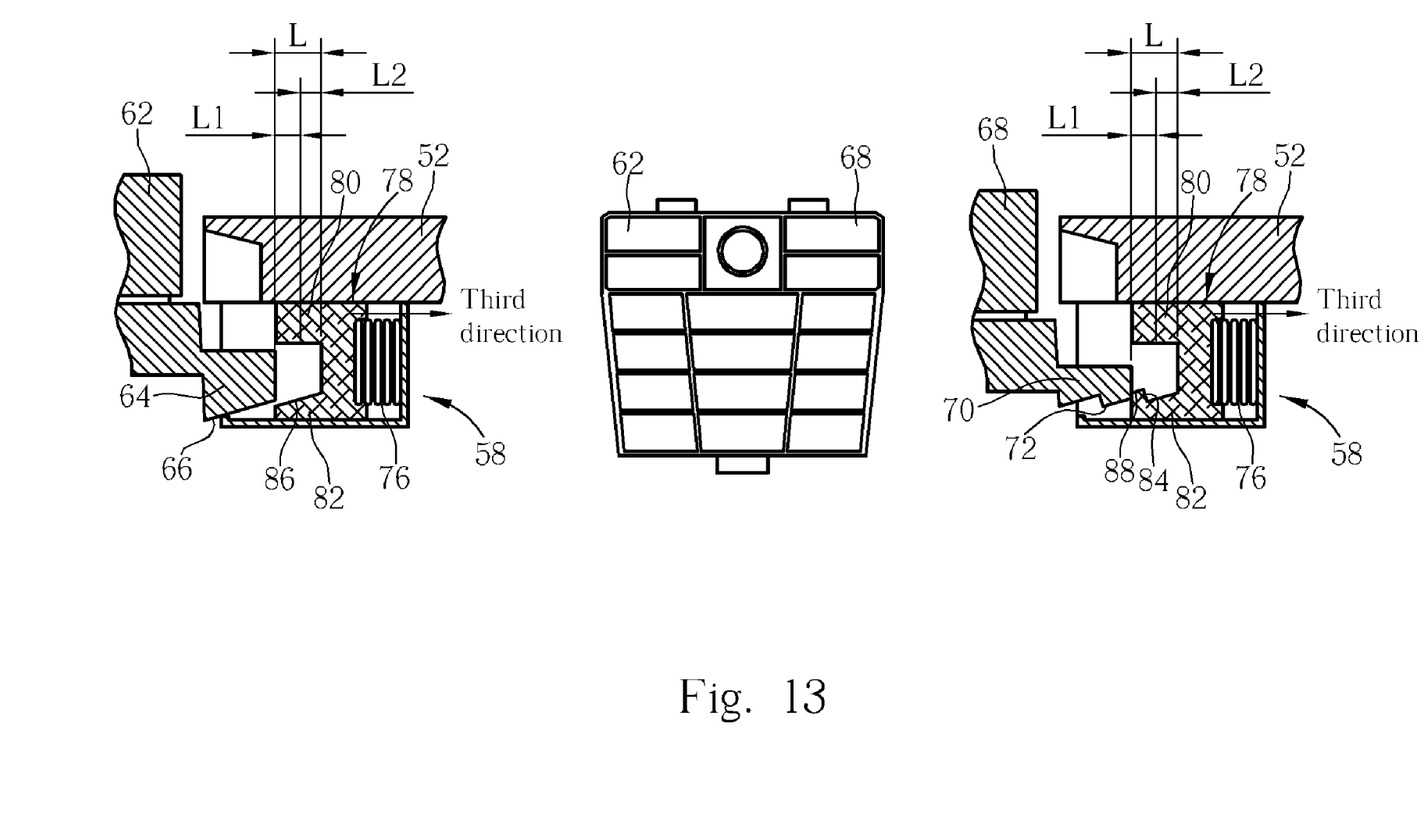
FIG. 13 illustrates a relative position diagram of a first tenon and a second tenon with a knob respectively when the first key and the second key are pressed simultaneously according to the present invention.

Step 102: Hold down the first key 62 and press the second key 68 simultaneously, please refer to FIG. 13. FIG. 13 illustrates a relative position diagram of a first tenon 64 and a second tenon 70 with a knob 78 respectively when the first key 62 and the second key 68 are pressed simultaneously. When the second key 68 is pressed, the second key pressed will correspondingly active the second tenon 70, at this time the second incline 72 of the second tenon 70 will generate a corresponding relative slide with the fourth incline 88 on the second wedge-shaped structure 84 of the knob 78, so that the knob 78 moves at a second distance L2 in a direction (the third direction) towards the compressed elastic structure 76, wherein sum of the first distance L1 and the second distance L2 can be designed to be equal to a contact length L, hence at this time the first tenon 64 and the second tenon 70 will completely withdraw from the knob 78.

Figure 14:
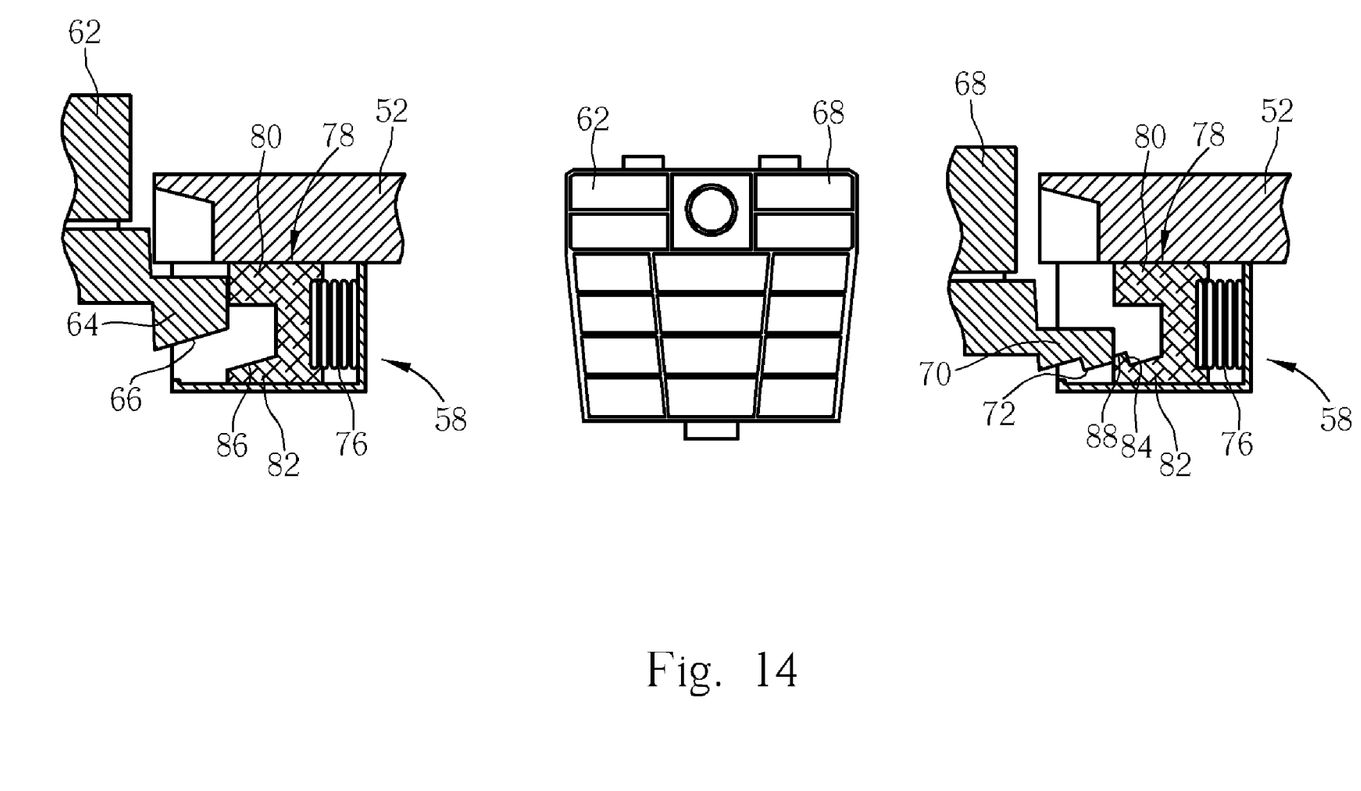
FIG. 14 illustrates a relative position diagram of a first tenon and a second tenon with a knob respectively when a first key is released and a second key is still pressed according to the present invention.

Step 104: Release the first key 62, please refer to FIG. 14. FIG. 14 illustrates a relative position diagram of a first tenon 64 and a second tenon 70 with a knob 78 respectively when a first key 62 is released and a second key 68 is still pressed. When the first key 62 is being released, the first tenon 64 will relatively return to its original position, however as the first tenon 64 still supports the pillar-shaped structure 80, therefore the knob 78 is unable to snap back to its original position.

Figure 15:
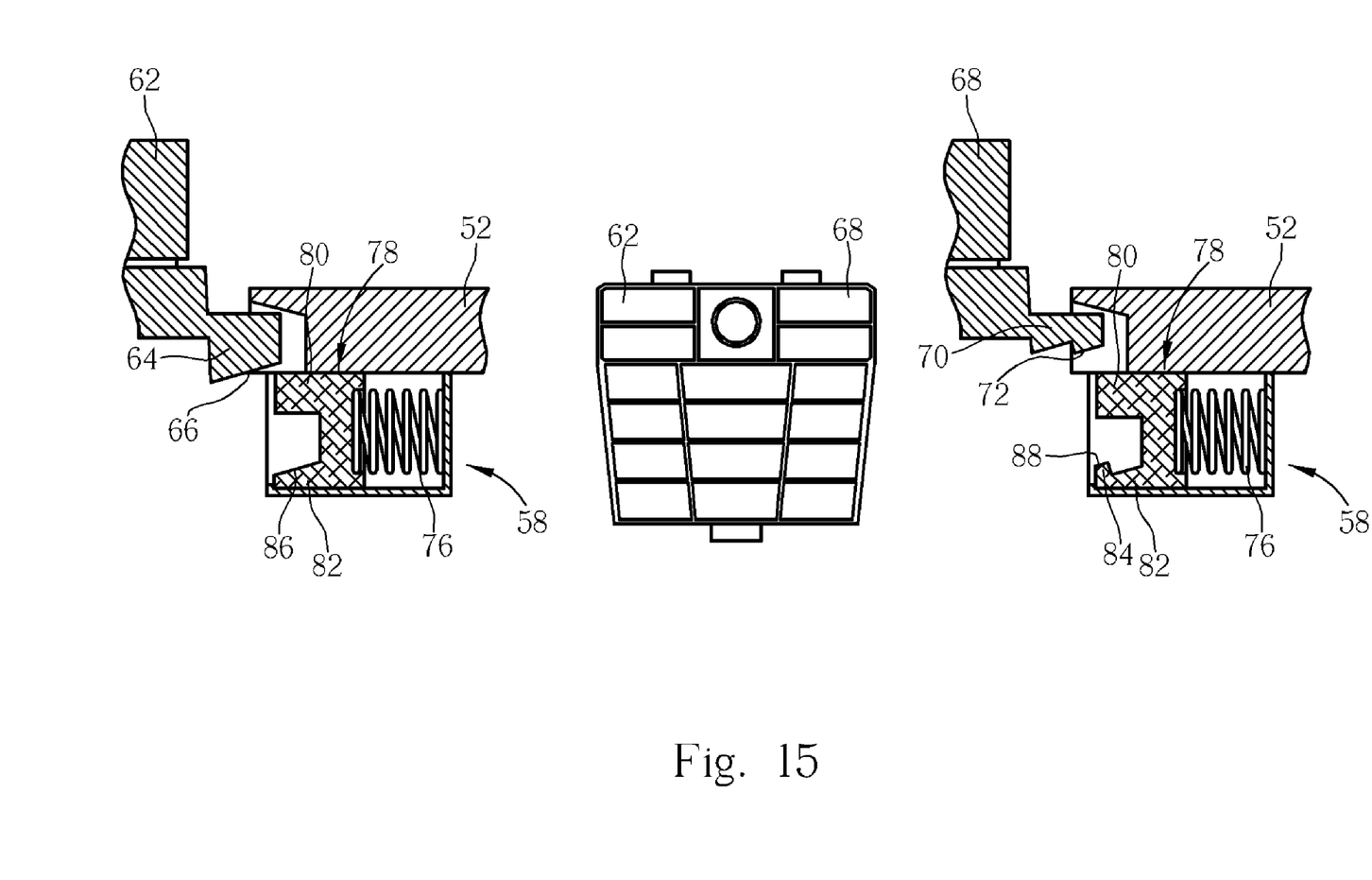
FIG. 15 illustrates a relative position diagram of a first tenon and a second tenon detaching from a knob respectively after the first key and the second key are released according to the present invention.

Step 106: Release the second key 68, please refer to FIG. 15. FIG. 15 illustrates a relative position diagram of a first tenon 64 and a second tenon 70 detaching from a knob 78 respectively after the first key 62 and the second key 68 are released. When the second key 68 is being released again, the second tenon 70 will relatively return to its original position, and also the knob 78 will be pulled back to its original position by a restoring force by the elastic structure 76.

Step 108: Lastly the key module 56 is completely withdrawn from the hole 60 of the housing 52 hence completes the action of disassembling of the key module 56.

In the above-mentioned, when the first key 62 is pressed and held down and at the same time the second key 68 is pressed and released, then the knob 78 will move at the second distance L2 towards the third direction so that the first tenon 64 and the second tenon 70 can be completely withdrawn from the knob 78. Given this configuration of using the first key and the second key in combination we can help the user avoid pressing only the first key 62 or only the second key 68 thus unintentionally withdrawing the key module 56 from the knob 78. In other words, the first key 62 and the second key 68 cannot function alone as the function key.

In comparison to the conventional method and mechanism of fabricating a key module in an electronic apparatus, the electronic apparatus of the present invention utilizes a two part fastening mechanism to achieve the function of assembling and disassembling the key module without removing the outer cover, and also without affecting the normal function of the key module, which means that there is no need to have an additional key, and the original keys having corresponding functions can be used as part of the assembling and disassembling mechanism, in this way the changing appearance of the electronic apparatus can be improved without increasing cost and allocation space and the result is that a more diverse interface can be provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus capable of conveniently assembling and disassembling a key module, the electronic apparatus comprising:
   a housing;
   a key module installed on the housing, the key module comprising:
      a first key;
      a first tenon, comprising a first incline, installed corresponding to the first key;
      a second key; and
      a second tenon, comprising a second incline, installed corresponding to the second key, and the second incline is higher than the first incline; and
   a retaining mechanism installed within the housing, the retaining mechanism comprising:
      an elastic structure; and
      a knob connected to the elastic structure, comprising:
         a third incline positioned corresponding to the first tenon for sliding on the first incline when the first key is pressed to move the knob at a first distance in a compressed direction of the elastic structure; and
         a fourth incline being higher than the third incline positioned corresponding to the second tenon for sliding on the second incline of the second tenon when the first key and the second key are pressed simultaneously to move the knob at a second distance in the compressed direction of the elastic structure.

2. The electronic apparatus of claim 1, wherein the key module comprises a third tenon for fastening the key module on the housing together with the first tenon and the second tenon.

3. The electronic apparatus of claim 1, wherein the first tenon and the second tenon are wedge-shaped structures.

4. The electronic apparatus of claim 1, wherein the retaining mechanism further comprises a knob-base for covering the elastic structure and the knob.

5. The electronic apparatus of claim 1, wherein the elastic structure is a spring.

6. The electronic apparatus of claim 1, wherein the knob further comprises a pillar-shaped structure, the pillar-shaped structure comprising:
   a first wedge-shaped structure installed at the bottom of the pillar-shaped structure, the third incline being formed on the first wedge-shaped structure; and
   a second wedge-shaped structure installed in between the pillar-shaped structure and the first wedge-shaped structure, the fourth incline being formed on the second wedge-shaped structure.

7. The electronic apparatus of claim 6, wherein the pillar-shaped structure, the first wedge-shaped structure, and the second wedge-shaped structure interconnect to form a monolithic structure.

8. The electronic apparatus of claim 6, wherein a sum of the first distance and the second distance is a contact length of the compressed direction of the elastic structure at the first tenon and the wedge-shaped structure when the first tenon is inserted into the knob.

9. The electronic apparatus of claim 1, wherein the electronic apparatus is a mobile phone.

10. The electronic apparatus of claim 1, wherein the electronic apparatus is a personal digital assistant (PDA).

* * * * *